(12) United States Patent
Szita

(10) Patent No.: US 6,624,963 B2
(45) Date of Patent: Sep. 23, 2003

(54) STATIC TRACK SPACING ERROR CORRECTION IN A DISC DRIVE

(75) Inventor: Gabor Szita, Santa Clara, CA (US)

(73) Assignee: Seagate Technology LLC, Scotts Valley, CA (US)

(*) Notice: Subject to any disclaimer, the term of this patent is extended or adjusted under 35 U.S.C. 154(b) by 339 days.

(21) Appl. No.: 09/774,134

(22) Filed: Jan. 30, 2001

(65) Prior Publication Data

US 2001/0040755 A1 Nov. 15, 2001

Related U.S. Application Data

(60) Provisional application No. 60/198,593, filed on Apr. 19, 2000.

(51) Int. Cl.⁷ .............................................. G11B 5/596
(52) U.S. Cl. .................................... 360/77.08; 360/77.04
(58) Field of Search .......................... 360/77.08, 77.04, 360/75, 48, 77.07, 77.02; 369/44.29, 44.32, 44.27, 53.14, 53.13

(56) References Cited

U.S. PATENT DOCUMENTS

| | | | |
|---|---|---|---|
| 4,933,795 A | 6/1990 | Nigam | |
| 4,982,295 A | * 1/1991 | Yakuwa et al. | 360/77.04 |
| 5,164,863 A | * 11/1992 | Janz | 360/57 |
| 5,404,255 A | 4/1995 | Kobayashi et al. | |
| 5,457,586 A | 10/1995 | Solhjell | |
| 5,473,550 A | 12/1995 | Cameron et al. | |
| 5,570,332 A | 10/1996 | Heath et al. | |
| 5,640,755 A | 6/1997 | Kubota et al. | |
| 5,760,990 A | 6/1998 | Ukani et al. | |
| 5,774,294 A | 6/1998 | Fioravanti | |
| 5,777,816 A | 7/1998 | Hampshire et al. | |
| 5,793,555 A | 8/1998 | Belser et al. | |
| 5,835,300 A | 11/1998 | Murphy et al. | |
| 5,844,675 A | 12/1998 | Hayes et al. | |
| 5,867,353 A | 2/1999 | Valent | |
| 5,940,240 A | 8/1999 | Kupferman | |
| 5,946,158 A | 8/1999 | Nazarian et al. | |
| 5,982,173 A | 11/1999 | Hagen | |
| 6,031,684 A | 2/2000 | Gregg | |
| 6,049,440 A | * 4/2000 | Shu | 360/77.04 |
| 6,067,204 A | 5/2000 | Tremaine | |
| 6,078,458 A | 6/2000 | Fioravanti et al. | |
| 6,091,567 A | 7/2000 | Cooper et al. | |
| 6,496,322 B1 | * 12/2002 | Hasegawa et al. | 360/77.08 |

* cited by examiner

Primary Examiner—Andrew L. Sniezek
(74) Attorney, Agent, or Firm—Merchant & Gould P.C.

(57) ABSTRACT

An apparatus and method for correcting static track spacing errors in a data storage device having a plurality of concentric servo tracks. The data storage device includes a disc having a plurality of concentric servo tracks, an actuator assembly including a head adjacent the disc, and a controller operable for controlling the position of the head relative to the disc and operable to determine a correction factor indicative of a static track spacing error between servo tracks. The correction factor is used during operation of the data storage device to generate a corrected position signal for use by the data storage device in positioning the head with respect to the disc.

17 Claims, 7 Drawing Sheets

STATIC TRACK SPACING ERROR CORRECTION IN A DISC DRIVE

RELATED APPLICATIONS

This application claims priority of U.S. provisional application Ser. No. 60/198,593, filed Apr. 19, 2000.

FIELD OF THE INVENTION

This application relates generally to correcting track spacing errors in a recording device and more particularly to a correcting static track spacing in a disc drive.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks. The data tracks are spaced radially from one another across a band having an inner diameter and an outer diameter. Each of the data tracks extends generally circumferentially around the disk and can store data in the form of magnetic transitions within the radial extent of the track on the disk surface. Typically, each data track is include a number of data sectors that store fixed sized data blocks.

A head includes an interactive element, such as a magnetic transducer, that is used to sense the magnetic transitions to read data, or to transmit an electrical signal that causes a magnetic transition on the disk surface, to write data. The magnetic transducer includes a read/write gap that positions the active elements of the transducer at a position suitable for interaction with the magnetic transitions on the surface of the disk, as the disk rotates.

As known in the art, the magnetic transducer is mounted by the head to a rotary actuator arm and is selectively positioned by the actuator arm over a preselected data track of the disk to either read data from or write data to the preselected data track, as the disk rotates below the transducer. The head structure includes a slider having an air bearing surface that causes the transducer to fly above the data tracks of the disk surface due to fluid currents caused by rotation of the disk.

An important aspect of conventional disk drive design concerns position control of the head. A position control system is used to accurately position a head over a data track during data read and write operations. Whenever data are either written to or read from a particular data track, the transducer gap of the head should be centered over the centerline of the magnetic transitions of the data track where the data are to be written or from where the data are to be read, to assure accurate transduction of the transitions representing data. If the head is off-center, the head may transduce (i.e. either read or write, as the case may be) transitions from an adjacent track, and thereby corrupt the data.

A closed loop servo system is typically used to control the position of the actuator arm. In a known servo system, servo position information is recorded on the disk surface itself, and periodically read by the head for use in controlling the position of the actuator arm. Such a servo arrangement is referred to as an embedded servo system. In modem disk drive architectures utilizing an embedded servo system, each data track is divided into a number of servo sectors generally equally spaced around the circumference of the data track. Each servo sector is further divided into a servo data field which contains information for positioning the head on the user track and a user data field where user information is read or written. Typically, user information is read and written to the data track in fixed size packets called data sectors. Data sectors may be written entirely within a single user data field on a user track or they may be written to the data track in a manner such that a servo sector splits the data sector between two data fields, as is well known.

Typically each servo sector is radially aligned with corresponding servo sectors of neighboring data tracks to form a set of radially extending, spoke-like servo sections that are equally spaced from one another around the circumference of the disk surface. The equal spacing between servo sectors provides a fixed frequency of servo occurrences regardless of the radial position of the head. However, when data are recorded in a zone bit arrangement, the number of data sectors within one rotation of a disk varies from zone-to-zone, thus causing the precise locations of servo sectors of the spoke-like sections, relative to the data fields of the data sectors, to vary from zone-to-zone and within a zone.

A zone bit arrangement is a known technique to maximize the storage capacity of a disk. In accordance with the fundamental geometry of a circle, the circumferences of the data tracks increase in a direction toward the outer diameter of the disk. Thus, each succeeding data track in the radially outward direction, has more potential data storage capacity than the preceding data tracks. A zone bit recording scheme takes advantage of the increasing circumference aspect of circle geometry. In a zone bit recording, the surface of the disk is divided into a set of zones. Each zone extends for a fixed radial length, and the magnetic transition frequency is increased from zone-to-zone, in the radially outward direction. Accordingly, the number of data sectors in each track increases, from zone-to-zone, in the radially outward direction.

In an embedded servo system, each servo field contains magnetic transitions, called servo bursts, that are arranged relative to a track centerline such that signals derived from the transitions can be used to determine bead position. For example, the servo information can comprise two separate bursts of magnetic transitions, one recorded on one side of the track centerline and the other recorded on the opposite side of the track centerline. Whenever a head is over a servo field, the head reads each of the servo bursts and the signals resulting from the transduction of the bursts are transmitted to, e.g., a microprocessor within the disk drive for processing.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

Servo bursts are typically written to the discs during the manufacture of a disc drive using a highly precise servo track writer, which utilizes the heads of the disc drive to write the servo bursts. As the servo bursts are used to define the tracks, it is important to precisely control the position of the heads as the servo patterns are written to the disc surfaces. Thus, a typical servo track writer comprises a positioning system which advances the position of the heads, a laser based position detector which detects the position of the heads and control circuitry which provides the servo information to be written to the servo fields on the discs.

Servo bursts may also be written to the disc with what is known as self-propagating servo writing. In self-propagating servo writing, the radial position signal that is used to servo-control the actuator is derived from measurements of the readback amplitude of servo bursts that were written during a previous step of the servo writing process. Thus, errors in the head position during servo writing appear as distortions away from a desired circular track shape.

As will be recognized, proper axial alignment and or spacing of the tracks on the disc is essential to facilitate reliable operation of the disc drive. While servo track writing techniques such as those described above provide a generally high degree of accuracy in axial track spacing, inaccuracies or errors in track spacing may still occur as the result of the servo writing process. In general, these track inaccuracies occur in two principle forms: dynamic or AC inaccuracies and static or DC inaccuracies. Dynamic or AC inaccuracies typically occur as a result of non-repeatable relative motion between the disc and the head during the servo writing process, which produces non-circular track shapes on the disc. In contrast, static or DC inaccuracies typically occur as the result of low frequency relative motion between the disc and the head during the track writing process and/or various inaccuracies of the track writing equipment. Whereas the effects of such errors has in the past had minimal impact upon the operation of the servo disc drive, as higher track densities are achieved, such errors become increasingly significant.

There is a need, therefore, for an improved approach to reducing DC inaccuracies in a disc drive servo track writer process. It is to such a need that the present invention is directed.

SUMMARY OF THE INVENTION

The present invention comprises a method and apparatus for correcting static track spacing errors between servo tracks on a disc of a data storage device.

In one embodiment, a distance between a first and second servo track on the disc is determined. Next, the average distance between all adjacent servo tracks on the disc is determined. The distance between a first and second servo track and the average distance between all adjacent servo tracks on the disc is then used to determine a correction factor which is indicative of a static track spacing error between the first servo track and the second servo tracks.

In another embodiment of the present invention a data storage device comprises a disc including a plurality of concentric servo tracks, wherein the average distance between adjacent servo tracks on the disc is predefined, and wherein a first pair of adjacent servo tracks are separated by a distance not equal to the predefined average distance between adjacent servo tracks. Also included in the data storage device an actuator assembly including a head adjacent the disc and a controller operable for controlling the position of the head relative to the disc. In this embodiment of the present invention, the controller is also operable to determine a correction factor indicative of a static track spacing error between the first pair servo tracks, store the correction factor, and to use the correction factor during operation of the disc drive to generate a corrected position signal for use by the servo system in positioning the head with respect to the disc.

These and various other features as well as advantages which characterize the present invention will be apparent from a reading of the following detailed description and a review of the associated drawings.

DETAILED DESCRIPTION

Figure 1:
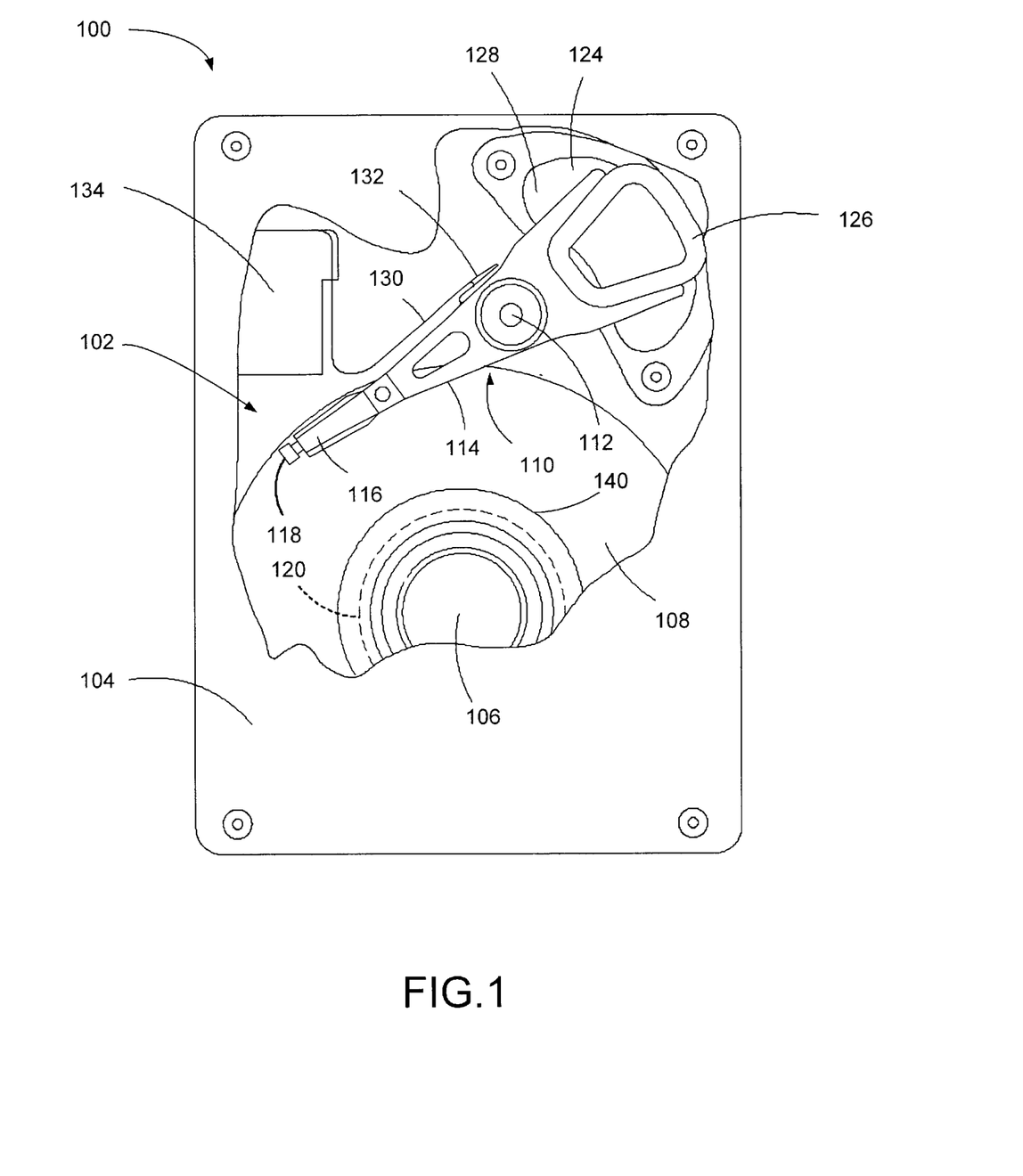
FIG. 1 is a plan view of a disc drive suited for use in the practice of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks 140 on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a write transducer (not shown) for writing to the disc 108 and a read transducer (not shown) for reading from the discs 108. Also mounted to the distal end of each of the flexures is an air bearing slider which enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

It will be recognized that in a typical disc drive there will be one head per disc surface, multiple discs, and multiply tracks on each disc. However, for purposes of clarity only one head 108 and one disc have been shown in FIG. 1. It will further be recognized that servo information will be prerecorded on at least of the surfaces of the discs 108 to provide the requisite servo positioning information to a servo system 520, which is shown generally in FIG. 5.

In a dedicated servo system one surface of one disc is designated as a dedicated servo surface so that servo information is prerecorded on all of the tracks and user data is stored on the remaining disc surfaces. In such a case one head would be a servo head and another head would be a data head. Alternatively, in an embedded servo system, the servo information is intermittently prerecorded on all of the tracks 140, so that each of the tracks 140 on the disc 108 would contain both servo information and user data and the heads 118 would operate as both a servo and a data head. In a preferred embodiment of the present invention an embedded servo system is used and for purposes of illustration track 140 is contemplated as including such embedded servo information which is read by the head 118 and provided to the servo loop shown in FIG. 4.

Figure 2:
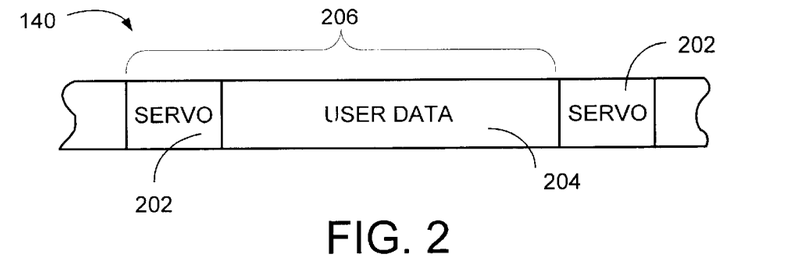
FIG. 2 provides a representation of a portion of a selected track of the disc drive of FIG. 1, illustrating the relative placement of servo fields and data fields on the selected track.

Referring now to FIG. 2, shown therein is a generalized representation of a portion of a selected data track 140 of the disc drive 100, illustrating the relative placement of servo fields 202 and user data fields 204 within a servo sector 206.

As will be recognized, the servo information on the discs 108 is recorded in the servo fields 202 during the manufacturing of the disc drive 100 using a highly precise servo writer, as described in greater detail below. User data sectors, used to store user data, are subsequently written in one or more user data fields 204. As is typical, the distance along the track 200 between adjacent servo fields 202 will vary depending upon the radius of the track 200. A selected number of the servo fields 202 are commonly written to all of the tracks 200 on each disc 108, with the start of each corresponding servo field 202 on each surface of the discs being radially aligned. However, as described previously, in a zone bit arrangement the surface of the disk is divided into a set of zones. Each zone extends for a fixed radial length, and the magnetic transition frequency is increased from zone-to-zone, in the radially outward direction. Accordingly, the number of servo sectors 202 in each track increases, from zone-to-zone, in the radially outward direction.

Figure 3:
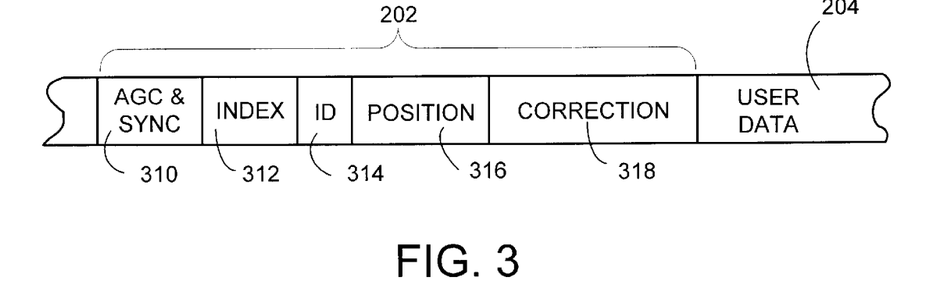
FIG. 3 illustrates the general format of a servo field of the disc drive servo system of FIG. 2.

The general format of a servo field 202, as shown in FIG. 3, comprises an AGC & Sync field 310, an index field 312, a track ID field 314 and a position field 316. The AGC & Sync field 310 facilitates the generation of timing signals used by the disc drive 100, the index field 312 indicates radial position of the track, the track ID field 314 provides the track address (number), and the position field 316 provides an indication of the position of the associated head 118 with respect to the servo frame 202. Of course, additional fields may be used as desired and the format of the fields in a servo frame will depend upon the construction of a particular disc drive; for more detailed discussion of typical servo fields see the Duffy et al. reference (U.S. Pat. No. 5,262,907) and the Weispfenning et al. reference (U.S. Pat. No. 5,136,439).

As also shown in FIG. 3, the servo field 202 further includes a correction field 318 which is used in the practice of the present invention. As discussed in greater detail below, correction data (in the form of a correction factor) is written to the correction field 318 and thereafter used in conjunction with the position field 316 to control the position of the head 118 and eliminate the effects of static track spacing errors. Although the correction field 318 is shown to be located just after the position field 316 and just before the beginning of a user data portion 320 of the track of FIG. 2, it will be understood that the correction field 318 can be located elsewhere in the frame 202, such as immediately before the position field 316.

Figure 4:
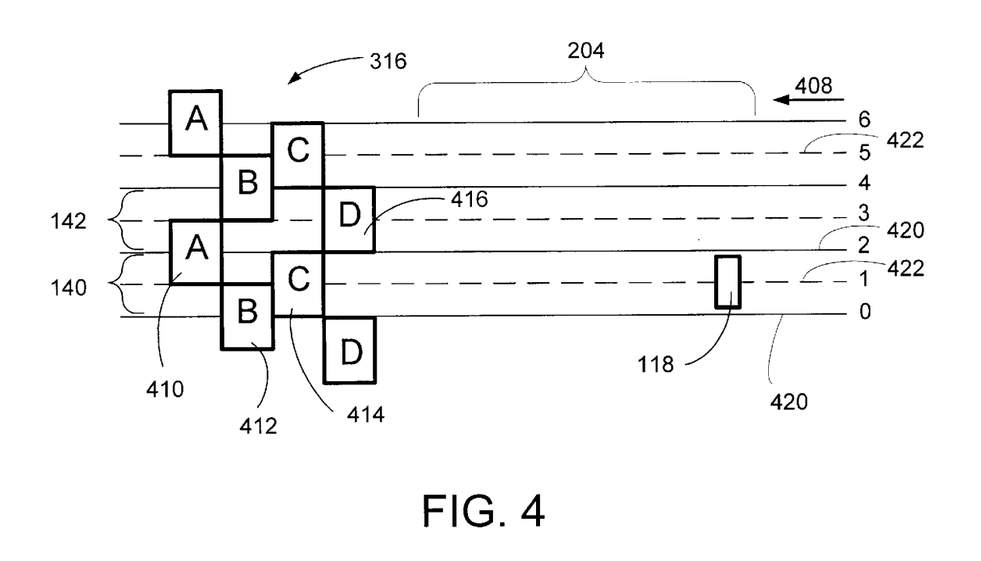
FIG. 4 illustrates a format of position field of the servo field of FIG. 3.

Before continuing with a discussion of the configuration and the use of the correction field 318, it will be helpful to first briefly discuss the position field 316, which preferably comprises four position burst fields arranged in an offset, quadrature pattern for a plurality of adjacent tracks. As shown more fully in FIG. 4, the position field 316 comprises burst patterns A, B, C, and D having selected geometries and magnetization vectors, which define the centers of a plurality of servo tracks, identified as lines numbered 0–6 on the right side of FIG. 4. As also shown in FIG. 4, a data track, such as track 140, is bounded on each side by an even numbered servo track, as indicated by even numbered solid lines 420. As shown in FIG. 4, the odd numbered servo tracks 422, indicated by dashed lines, define the center of a data track. Additionally, the head 118 of FIG. 1 is represented in FIG. 4 as being centered on track 140. The direction of rotation of the disc 108 (and hence the position field 316) relative to the head 118 is shown by an arrow 408. Thus, as the head 118 passes over the position field 316 on track 140, the head will pass over portions of the A and B burst patterns (identified as 410 and 412, respectively) and then over the C burst pattern 414. However, the head 118 will not encounter the D burst pattern 416, as this pattern is on an adjacent track.

Generally, it will be recognized that when the head 118 is positioned over a servo track defining the mid-point of data track, such as track 140, the amplitude of an A burst signal induced in the head 118 by the A burst pattern 410 will be equal to the amplitude of a B burst signal induced in the head by the B burst pattern 412. Moreover, the amplitude of a C burst signal induced by the C burst pattern 414 will have a maximum value and the amplitude of a D burst signal from the D burst pattern 416 will be nominally zero. Further, when the head 118 is positioned over the a servo track such as servo track 2, the amplitudes of the C and D burst signals from the patterns 414 and 416 will be equal in magnitude, the B burst signal from the pattern 412 will have a maximum value and the A burst from the pattern 410 will be zero. Thus, as the head 118 is swept from one even numbered servo track to the next even numbered servo track, the amplitudes of the A, B, C and D burst signals cycle between zero and maximum values and these amplitudes are used to generate the PES indicating the position of the head 118 with respect to the center of the track 140.

Figure 5:
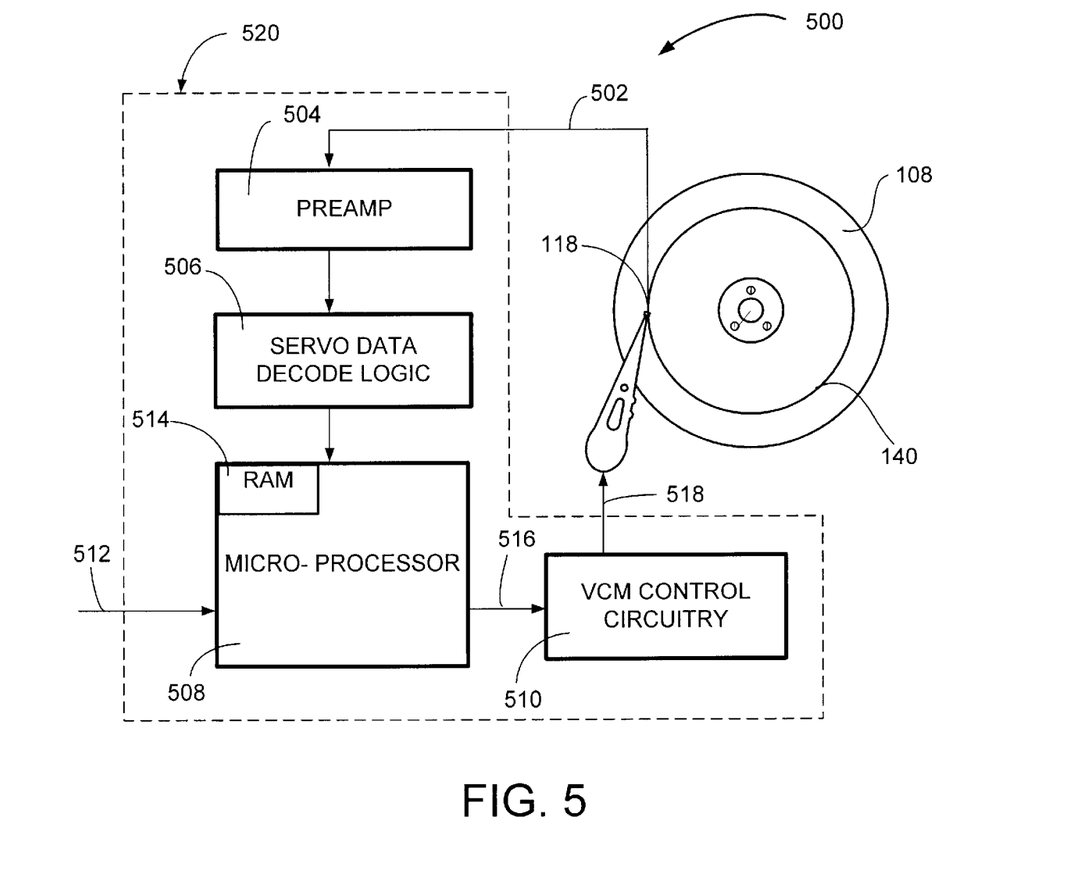
FIG. 5 illustrates a functional block representation of a servo system for the disc drive of FIG. 1 in which the present invention is particularly useful.

Referring now to FIG. 5, the disc drive 100 preferably includes a servo loop 500 employing a servo system 520. In operation of the disc drive 100, as the head 118 travels over the track 140 and reads the servo information from the servo field 202 (FIG. 2). This servo information is then amplified by a preamp circuit 504 and provided to a servo data decode logic circuitry 506. The servo data decode logic circuitry 506 typically includes an analog to digital converter (ADC) so that selected digital representations of the servo information are provided to a servo microprocessor 508. The servo microprocessor 508 generates a position error signal (PES) from the servo information and uses the PES to generate and output a correction signal to a VCM control circuitry 510. The servo microprocessor 508 determines the correction signal in accordance with commands received by a disc drive system microprocessor (not shown) by way of signal path 512 and programming steps stored in a servo RAM 514. The correction signal is provided to the VCM control circuitry 510, which includes a power amplifier (not shown) that outputs a controlled dc current of a selected magnitude and polarity to the coil 126 in response to the correction signal. Thus, during track following mode, the servo information indicates the relative position error of the head 118 with respect to the center of the track 140 and the correction signal causes a correction in the dc current applied to the coil 126 in order to compensate for this position error and move the head 118 to the center of the track 140 (or another position relative to the track 140, as desired). For additional discussion concerning the general construction and operation of the servo loop 500, see the Duffy et al. reference (U.S. Pat. No. 5,262,907) and the Weispfenning et al. reference (U.S. Pat. No. 5,136,439) assigned to the assignee of the present invention. Moreover, it will be understood that new, additional programming in accordance with the present invention is stored in the RAM 514 and used by the servo microprocessor 508 in controlling the operation of the servo loop 500 as discussed in greater detail below.

As discussed above, the servo frames 202 written during the servo track write operation will typically not be perfectly equally spaced due to static inaccuracies as the result of low frequency relative motion between the disc and the head during the track writing process and/or various inaccuracies of the track writing equipment. Such static inaccuracies will generally result from bearing tolerances, out of balance discs, mechanical resonances and tolerances of the servo track writer, and other factors. Whereas such errors in the past have generally had a negligible effect upon the operation of the disc drive 100, as track densities increase, such errors become increasingly significant.

Figure 6:
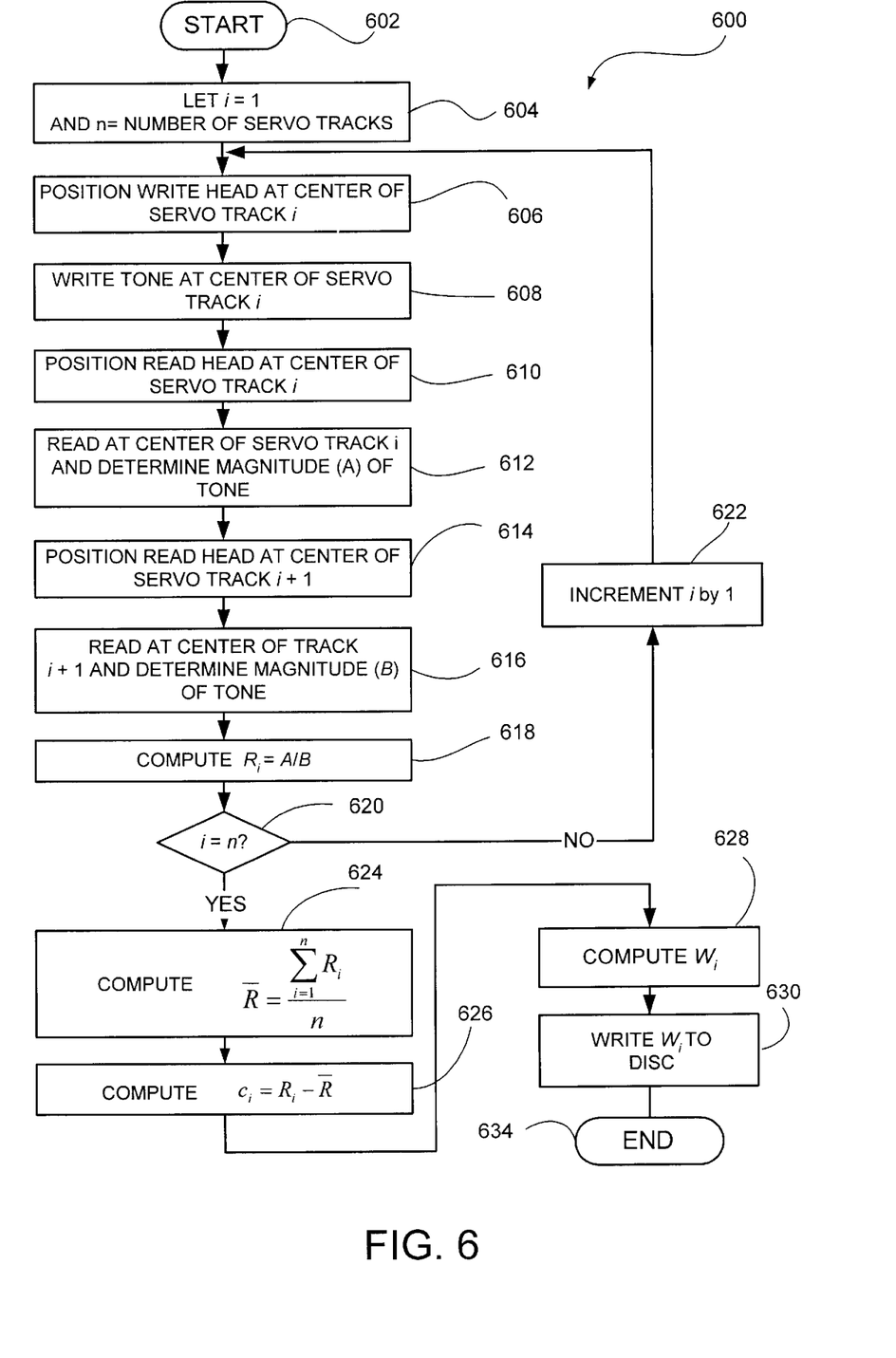
FIG. 6 is a generalized flow-chart illustrating the general steps performed in the practice of an embodiment of the present invention used to correct static track spacing errors in the disc drive of FIG. 1.

An embodiment of the present invention provides an apparatus and/or method for correcting static errors (track spacing errors) in a disc drive device. FIG. 6 provides a flowchart illustrating the general steps performed in the practice of the an embodiment of the present invention and is generally indicative of top level programming used by a disc drive microprocessor, such as microprocessor 508 (FIG. 5), in the control of the servo system 520. The logical operations of the embodiments of the invention herein described may be implemented (1) as a sequence of microprocessor implemented acts or program modules running on a microprocessor and/or (2) as interconnected machine logic circuits or circuit modules within a computing device. The implementation is a matter of choice dependent on performance requirements. Accordingly, the logical operations described may be referred to variously as operations, routines, structural devices, acts, or modules. While the logic operations of following embodiments of the invention are discussed as being implemented as software stored on a computer readable media, it will be recognized by one skilled in the art that these operations, structural devices, acts and modules may be implemented in software, in firmware, in special purpose digital logic, and any combination thereof without deviating from the spirit and scope of the present invention as recited within the claims attached hereto.

A computing device, such as the microprocessor 508 typically includes at least some form of computer-readable media, such as RAM 514. Computer readable media can be any available media that can be accessed by the microprocessor 508. By way of example, and not limitation, computer-readable media might comprise computer storage media and communication media.

Computer readable media, as used herein, can be any available media that can be accessed by a processor, such the microprocessor 508 described above. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disc storage or other magnetic storage devices, or any other medium that can be used to store the desired information and that can be accessed by the microprocessor 508.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The operational flow 600 of an embodiment of the present invention, as shown in FIG. 6, will now be described. Preferably, this process will take place during a certification process which occurs after the disc drive has been assembled and after servo information has been written to the disc. It is to be understood that the process herein described is not dependent on the method in which the servo information has been written to the disc. For example, the servo information may have been written to the disc in a conventional manner with a servo writer, using self-propagating servo writing techniques, or by any similar servo writing technique. Preferably, the operational flow of the described below takes place entirely within the disc drive 100 under the control of microprocessor 508. However, it is to be understood that the operational flow described below could alternatively take place under the control of a processor outside of disc drive 100, such as a personal computer or work station operatively attached to the disc drive 100. In another embodiment, this method can be applied during self propagated servo track writing to continuously correct the track spacing errors during the propagation process.

As shown in FIG. 6, as the process begins 602, initiating operation 604 sets the value of i to 1 (i=1) and the value of n to the number of servo tracks over which the process will be performed (n=number of servo tracks). Preferably, n will be set to equal the total number of servo tracks on the zone or surface of the disc 108 which is currently being accessed by servo loop 500. However, n may be set to equal any number of servo tracks over which correction of static errors is desired. The initiating operation 604 will preferably be carried out by the microprocessor 508.

Figure 7:
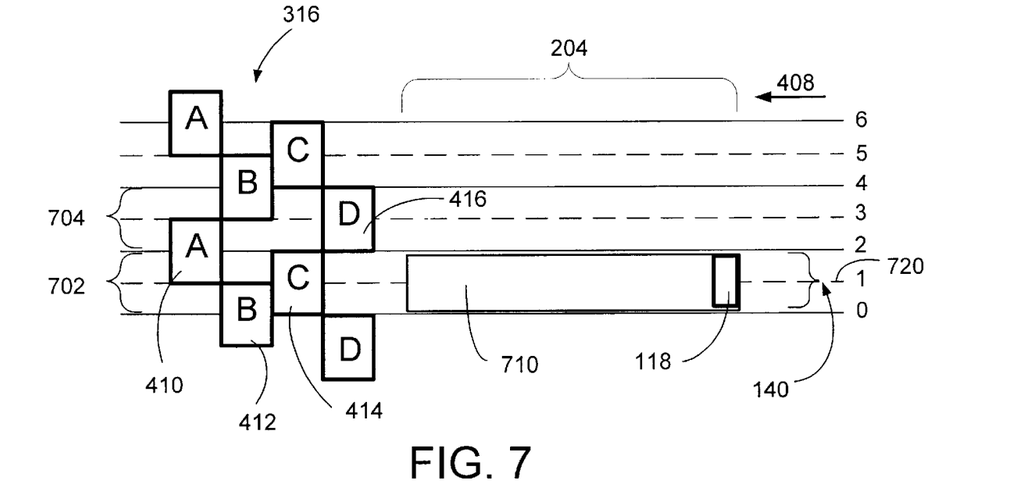
FIG. 7 illustrates the writing of a tone along a first servo track of the disc drive of FIG. 1.

Next, positioning operation 606 positions the write transducer of the head 118 over the center of servo track i. As i has been previously set to equal 1, the positioning operation 606 positions the write transducer over the center of servo track 1 (indicated by reference numeral 720), as shown in FIG. 7. The write transducer of the head 118 is preferably positioned and maintained in the center of the data track 702 over the servo track 1 by the servo system 520 while the disc 108 is rotating in the direction indicated by arrow 408.

As shown in FIG. 6, writing operation 608 then writes a tone 710, comprising a series of magnetic transitions, in the data field portion 204 of the data track 702 along servo track i (servo track 1). The frequency of the tone should be chosen such that a good signal to noise ratio is achieved when the signal is read by the read transducer. Preferably, the tone 720 will be written to each of the data fields 204 located in the data track 720. The writing operation 608 will preferably be carried out by the servo system 520 while the disc 108 rotates in the direction indicated by arrow 408. As shown in FIG. 7, during the writing operation 608 the write transducer of head 118 is positioned over the center of servo track i (servo track 1) at the mid-point of the first data track 702. As the disc 108 continues to rotate in the direction of arrow 408, the tone 710 is preferably written in each user data field 204 of the first data track 702 by the write transducer of the head 118. The write transducer of the head 118 is preferably positioned and maintained in the center of the data track 702 over the servo track 1 during the writing of the tone 710. In an alternative embodiment of the present invention, the tone 720 may be written to fewer than all of the user data fields 204 located on the data track 702.

Figure 8:
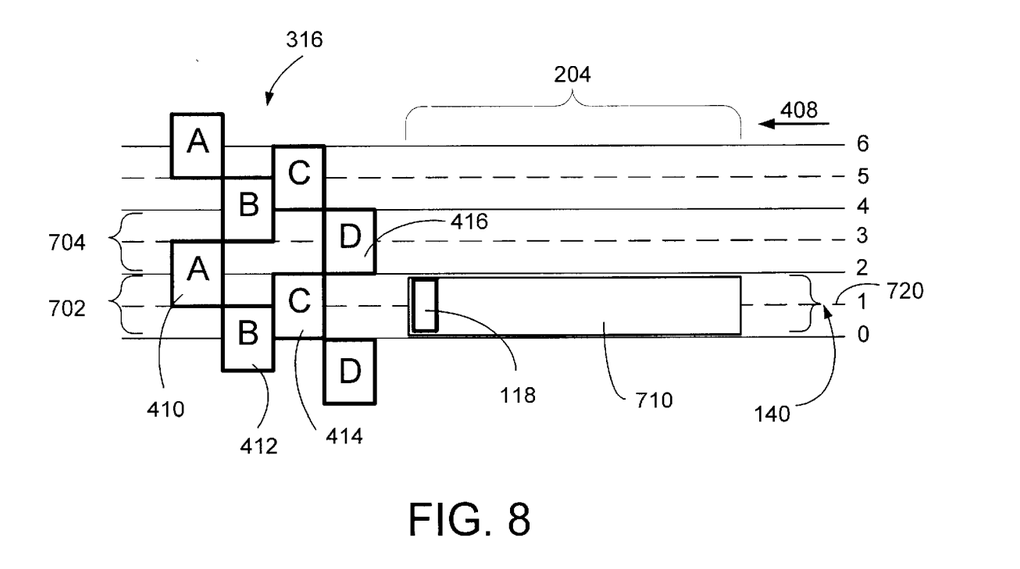
FIG. 8 illustrates the reading of the tone along the first servo track of the disc drive of FIG. 1.
Figure 9:
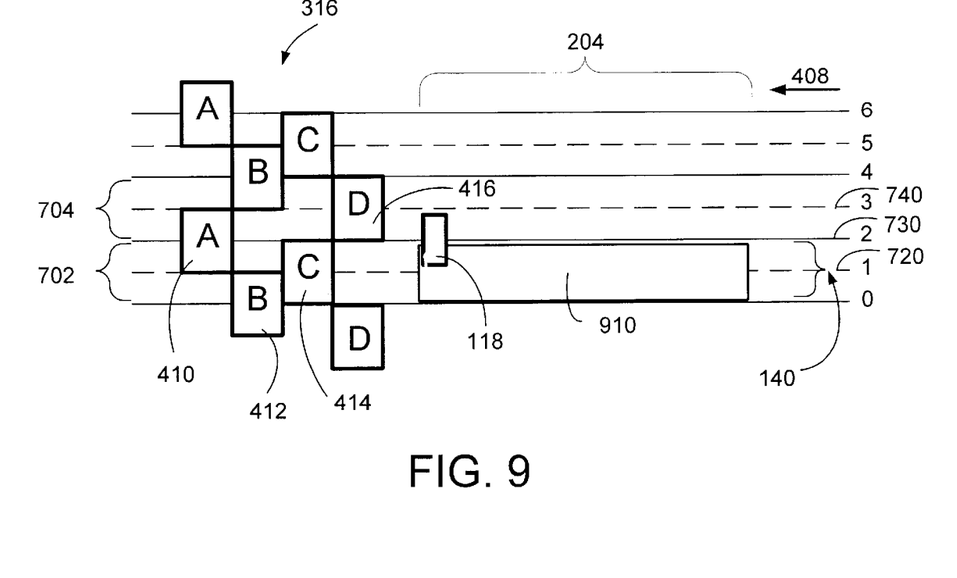
FIG. 9 illustrates the reading of the tone along a second servo track of the disc drive of FIG. 1.

Following the writing of the tone 710 along servo track i (servo track 1) in the center of the first data track 702, positioning operation 610 positions the read transducer of the head 118 over the center of servo track i. Again, as i has been previously set equal 1, the positioning operation 610 positions the read transducer over the center of servo track 1 (indicated by reference numeral 720), as shown in FIG. 8. The read transducer of the head 118 is preferably positioned and maintained in the center of the data track 702 over the servo track 1 by the servo system 520 while the disc 108 is rotating in the direction indicated by arrow 408.

Next, reading operation 612 reads the tone 710 and the magnitude of the tone 710 read is denoted as A and stored. That is, during read operation 612 the read transducer of the head 118 is positioned over servo track i (servo track 1) in the center of data track 702 and the magnitude of the tone 710 at this location is measured and denoted as A, as shown in FIG. 8. In a preferred embodiment of the present invention, as described above, tones will have been written to each of the user data fields around the data track 702. As such, the magnitude of each of these tones will be measured and stored. The average of the magnitude of all of the tones read during read operation 612 will then preferably denoted as A and stored. Alternatively, if the tones 720 have been written to fewer than all of the user data fields 204 located on the data track 702, the magnitude of each of those tones written will be measured and the average value of those magnitudes will be denoted as A and stored. The positioning of the head 118 over the servo track i and the measurement of the magnitude of the tone 710 is preferably carried out in a conventional manner by the servo system 520.

As shown in FIG. 6, positioning operation 614 then positions the read transducer of the head 118 over the center of servo track i+1. As i has been previously set equal 1, the positioning operation 614 positions the read transducer over the center of servo track 2 (indicated by reference numeral 730). The read transducer of the head 118 is preferably positioned and maintained over the servo track i+1 (servo track 2) by the servo system 520 while the disc 108 is rotating in the direction indicated by arrow 408.

Next, reading operation 616 reads the tone previously written by write operation 608 and the magnitude of the tone 710 read is denoted as B and stored. That is, during read operation 616 the read transducer of the head 118 is positioned over servo track i+1 (servo track 2) (indicated by reference numeral 730) and the magnitude of the tone 710 (FIG. 8) as read by the head 118 will be measured and denoted as B. In a preferred embodiment of the present invention, as described above, tones will have been written to each of the user data fields around the data track 702. As such, the magnitude of each of these tones 710 will be measured and stored. The average of the magnitude of all of the tones read during read operation 612 will then preferably denoted as B and stored. Alternatively, if the tones 720 have been written to fewer than all of the user data fields 204 located on the data track 702, each of the tones written will be measured and the average value of those magnitudes will be denoted as B and stored. The positioning of the head 118 over the servo track i+1 and the measurement of the magnitude of the tone 710 is preferably carried out in a conventional manner by the servo system 520.

As will be understood, before writing operation 608 has written a tone 710 in the data field portion 204 of the data track 702 along servo track i (servo track 1), a DC erase will preferably have been applied along servo track i+2. That is, a non alternating field will have been written to along servo track i+2, thus allowing a more accurate reading of the magnitude of the tone 710 during reading operation 616.

As shown in FIG. 6, after magnitudes A and B have been determined, computing operation 618 computes the ratio of magnitude A to magnitude B and denotes the resultant ratio as $R_i$($R_i$=A/B). That is, the magnitude A will be divided by the magnitude B and the result will be denoted as $R_1$, as i has been previously set to equal 1 by initiating operation 612. The computing operation 618 will preferably be carried out by the microprocessor 508.

After Ri has been computed, determining operation 620 will determine if i is equal to n (the number of number of servo tracks over which correction of static errors is desired). As described above, n is preferably the number of servo tracks on the disc. If i is not equal to n, incrementing operation 622 will increment i by two. The operations 606, 608, 610, 612, 614, 616, 616, and 618 heretofore described will be repeated until i=n. In this way, the magnitudes A and B, as well as the associated $R_i$, will be computed and stored for each data track (such as data tracks 702, 704, and so on) over which the correction of static errors is desired.

When determining operation 620 determines that i equals n, that is when $R_i$ has been computed for all of the desired data tracks, computing operation 624 will compute the average ratio $\overline{R}$ of all $R_i$s (for example $R_1, R_2, R_3$, and so on) up to $R_n$. $\overline{R}$ is preferably computed according to the following equation:

$$\overline{R} = \frac{\sum_{i=1}^{n} R_i}{n}$$

The computing operation 624 will preferably be carried out by the microprocessor 508.

Following computing operation 624, computing operation 626 will compute a correction number $c_i$ for each value i up to n, where $c_i = R_i - \overline{R}$. That is, a correction number $c_i$ will be computed for each servo track over which the process 600 has been performed. The computing operation 626 will preferably be carried out by the microprocessor 508. As will be understood, if the ratio $R_i$ for servo tracks i and i+1 is larger than the average ratio $\overline{R}$, servo tracks i and i+1 are closer to each other than a "typical desired track spacing" at that radius. Conversely, if the ratio $R_i$ for servo tracks i and i+1 is smaller than the average ratio $\overline{R}$, servo tracks i and i+1 are farther from each other than the desired track spacing.

It will also be understood that a desired track pitch will typically vary as a function of head skew, which varies as the actuator traverses its arcuate path. To preserve the accuracy of approximations relating to head skew, note that this "spacing" is convenient to define as a circumferential offset along the arcuate path of the head.

The static inaccuracy of the servo tracks on the disc 108 are approximately proportional to the absolute value of $c_i$. Thus, a correction factor $W_i = Kc_i$ can be determined 628 for each servo track, where K is constant conversion factor between the magnitude ratio and track spacing.

Figure 10:
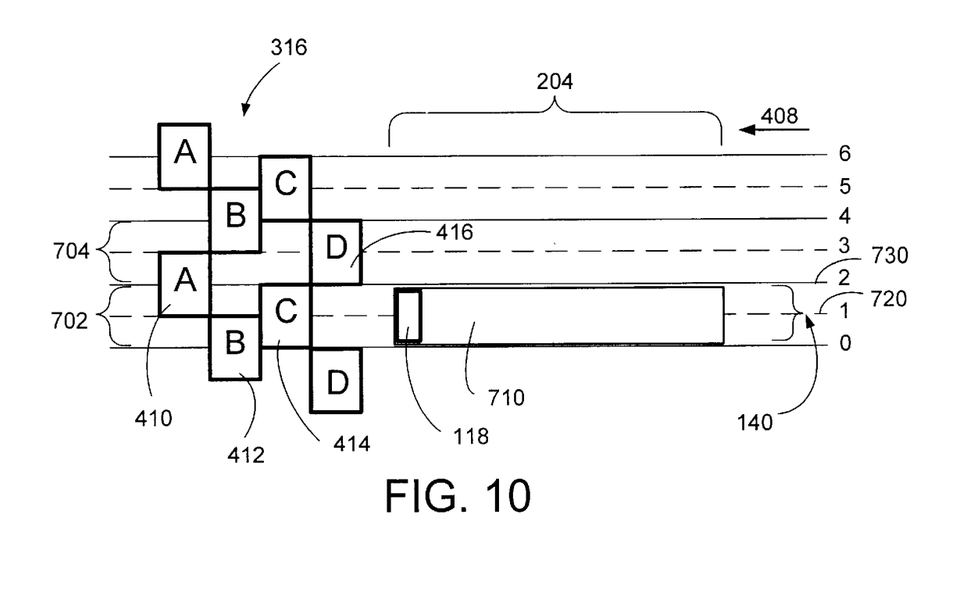
FIG. 10 illustrates the reading of the tone along the first servo track of the disc drive of FIG. 1.
Figure 11:
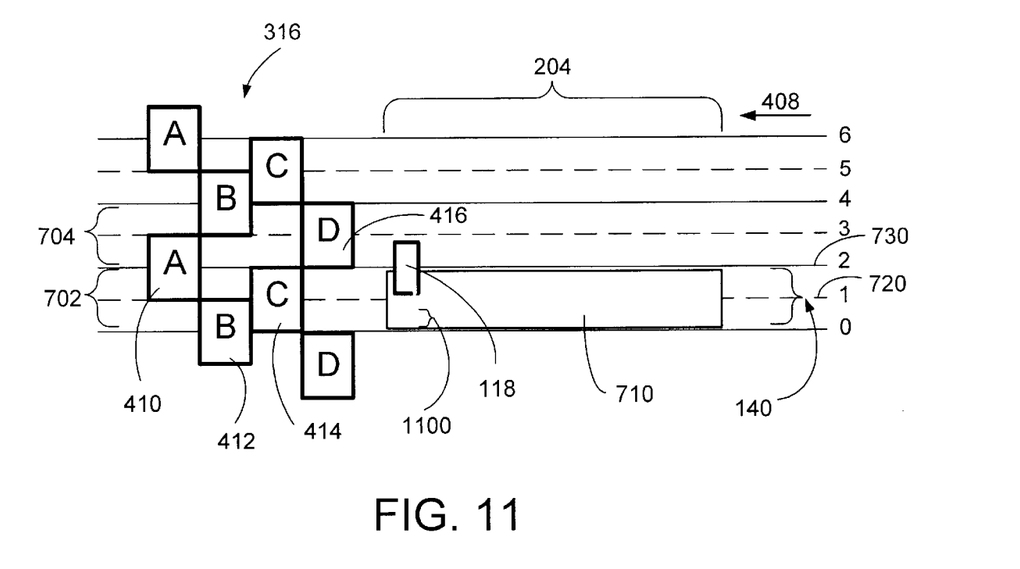
FIG. 11 illustrates the reading of the tone along the second servo track of the disc drive of FIG. 1.
Figure 12:
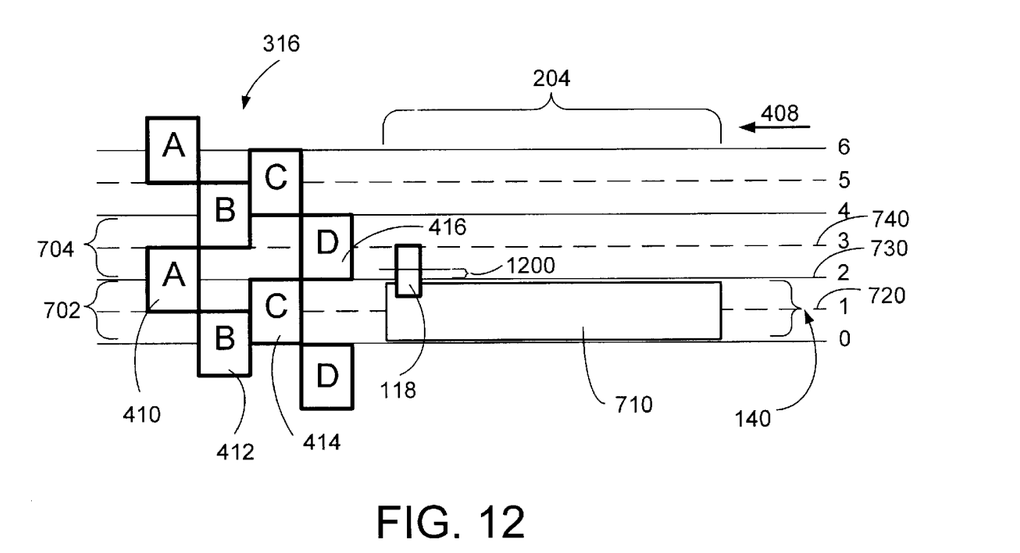
FIG. 12 illustrates the reading of the tone at a predetermined distance from the second servo track of the disc drive of FIG. 1.

The constant K translates magnitude variation to head position displacement. The value of K can be calculated as follows. For example, and with respect to servo track 1 720 and the previously written tone 710, the read transducer of the head 118 is moved to servo track 1 720, and the magnitude of the signal generated by the tone 710 in the read transducer of the head is measured, as shown in FIG. 10. This magnitude is then denoted by $M_1$. The read transducer is then moved to track 2 730, as shown in FIG. 11, and the magnitude of the signal $M_2$ generated by the tone 710 in the read transducer of the head is measured again. The head 118 is then moved by a small amount d 1200 in the direction of servo track 3 740, as shown in FIG. 12. Preferably, the value of d will be approximately 10.20% of the distance between two servo tracks 1 and 2, i.e. d=0.1 . . . 0.2. The magnitude of the signal generated by the tone 710 is then measured and denoted as $M_3$. Finally, the value of the correction factor may be calculated as $K=(M_2/M_1 - M_3/M_1)/d$.

Once the correction factor $W_i$ has been determined for a particular track, this track correction factor is written 630 to a correction field 318 (FIG. 3). For example, the track correction factor computed for track 140 will be written to the correction fields 318 located in each of the servo fields 202 of track 140. A particular track correction factor $W_i$ for a given user may be written to the correction fields 318 of that given track either immediately after the particular user track correction factor $W_i$ has been computed or at a later time. In a preferred embodiment, these correction factors reduce the inter-track offset irregularities enough so that successive offsets differ from each other by less than 0.1%, and more preferably less than 0.01%.

The user data is typically not written on every servo track. Preferably, user data is written only on every second or third servo track. In a preferred embodiment of the present invention, the correction factors are written only to the correction fields 318 associated with the user tracks. That is, the correction factors are written only to the correction fields 318 of tracks on which user data is to be written. The correction factors belonging to servo tracks where no user data is to be written can be discarded.

During operation of the disc drive, the user track correction factor for a particular user track is read from the correction fields of that user track and added to the position error signal generated by the servo bursts for that given user track, thereby correcting any static track spacing errors which may be present.

In an alternate embodiment of the process 600, a unique user track correction factor $W_i$ may be computed for one or more individual servo sectors on a user track. That unique user track correction factor $W_i$ will then be written only to the correction field 318 associated with that particular servo field 202.

In summary, in view of the foregoing discussion it will be understood that a first embodiment of the present invention provides a method for correcting static track spacing errors between the servo tracks (such as 720 and 730) in a disc drive (such as 100) having a disc (such as 108) with a plurality of nominally concentric servo tracks, an actuator assembly (such as 110) adjacent the disc, and a servo system (such as 520) for controlling the position of a head (such as 118 of the actuator assembly relative to the disc. The method includes steps of determining (such as 618) a value R, wherein R is indicative of the distance between a first servo track (such as 720) and a second servo track (such as 730). After R has been determined a value $\overline{R}$ is determined (such as 624), wherein $\overline{R}$ is indicative of an average distance between selected adjacent servo tracks on the disc. A correction factor W indicative of a static track spacing error between the first servo track and the second servo tracks is then determined (such as 520) using R and $\overline{R}$. The correction factor W is then stored (such as 630) and used during operation of the disc to generate a corrected position signal for use by the servo system in positioning the head with respect to the disc.

In this first embodiment of the present invention, the head preferably includes a read transducer and a write transducer. The value R is the preferably determined by first positioning the write transducer over the first servo track (such as 606). A first tone (such as 710) is then written (such as 608) along the first servo track using the write transducer. The read transducer is then positioned over the first servo track (such as 610). Next, a first magnitude of the first tone is determined using the read transducer and the first magnitude of the first tone is denoted as A (such as 612). The write transducer is then positioned over the second servo track (such as 614) and the magnitude of the first tone is determined using the read transducer. This second magnitude is denoting as B (such as 616). Finally, the ratio of magnitude A to magnitude B is computed and denoting the ratio as R (such as 618).

In this first embodiment of the present invention, the disc drive preferably includes a user track (such as 140) including a correction field (such as 318) and the correction factor W is preferably stored in the correction field.

Additionally, in this first embodiment of the present invention the value $\overline{R}$ is the preferably determined by first setting a variable i equal 1 and a variable n equal to a predetermined number of servo tracks (such as 604). The write transducer is then positioned over the servo track i (such as 606) and a tone is written along servo track i using the write transducer (such as 608). Next, the read transducer is positioned over the servo track i (such as 610) and a first magnitude of the tone written is determined using the read transducer and denoted as B (such as 612). The read transducer is then positioned over the servo track i+1 (such as 614) and a second magnitude of the tone written is determined using the read transducer (such as 616). The second magnitude of the first tone is then denoted as B (such as 616). The ratio of magnitude A to magnitude B is then computed and denoted as $R_i$ (such as 618) and the value i is incremented by 1 (such as 622). The following steps are then repeated until iteratively i=n+1. Finally, $\overline{R}$ is computed where $\overline{R}$ is equal to the sum of all $R_i$s from i=1 to i=n and the resultant sum is divided by n (such as 624).

A second embodiment of the present invention comprises a data storage device (such as 100) having a disc (such as 108) including a plurality of concentric servo tracks (such as 720 and 730), wherein the average distance between adjacent servo tracks on the disc is predefined, and wherein a first pair of adjacent servo tracks are separated by a distance not equal to the predefined average distance between adjacent servo tracks. In addition, the data storage device of this first embodiment preferably includes an actuator assembly (such as 110) including a head (such as 118) adjacent the disc and a controller (such as 520) connected to the head for controlling the position of the head relative to the disc. Preferably, the controller is further operable to determine a correction factor W indicative of a static track spacing error between the first pair servo tracks (such as 628), to store the correction factor W, (such as 630), and to use the correction factor W during operation of the disc drive to generate a corrected position signal for use by the servo system in positioning the head with respect to the disc.

Preferably, the data storage device of this second embodiment of the present invention is selected from a group consisting of magnetic disc drives, optical disc drives, and magneto-optical disc drives. Additionally, in this second embodiment, the correction factor W is stored on the disc.

It will be clear that the present invention is well adapted to attain the ends and advantages mentioned as well as those inherent therein. While a presently preferred embodiment has been described for purposes of this disclosure, various changes and modifications may be made which are within the scope and spirit of the present invention. For example, while the various embodiments of the present invention have been described with respect to specific dividing and summing processes for deriving $\overline{R}$ and W, many similar methods for arithmetically combining $R_i$ and other values to obtain equivalent results will be apparent in light of the above description. Numerous other changes may be made which will readily suggest themselves to those skilled in the art and which are encompassed in the scope and spirit of the invention as disclosed and as defined in the appended claims.

What is claimed is:

1. In a disc drive having a disc with a series of many nominally concentric servo tracks, an actuator assembly adjacent the disc, and a servo system for controlling the position of a head of the actuator assembly relative to the disc, a method for correcting static track spacing errors between the servo tracks, comprising steps of:

(a) determining a value $R_P$ indicative of an offset between a first and a second adjacent ones of the servo tracks;

(b) determining a value $R_Q$ indicative of an offset between a third and a fourth adjacent ones of the servo tracks;

(c) deriving $\overline{R}$ as an arithmetic combination of $R_P$ and $R_Q$, wherein $\overline{R}$ is indicative of a typical adjacent-track offset for at least several of the servo tracks;

(d) deriving a correction factor $W_P$ as an arithmetic combination of $R_P$ and $\overline{R}$, wherein $W_P$ is indicative of a static track spacing error between the first and second servo tracks;

(e) storing the correction factor $W_P$; and (f) using the correction factor $W_P$ during operation of the disc drive to generate a corrected position signal for use by the servo system in positioning the head with respect to the disc.

2. The method of claim 1 in which the deriving step (c) comprises calculating an arithmetic mean of many values each derived from a measurement taken at a different one of the many servo tracks.

3. The method of claim 1, wherein the head includes a read transducer and a write transducer, and wherein the determining step (a) comprises steps of:

(a1) positioning the write transducer over the first servo track;

(a2) writing a first tone along the first servo track using the write transducer;

(a3) positioning the read transducer over the first servo track;

(a4) determining a first magnitude $A_P$ of the first tone using the read transducer;

(a5) positioning the read transducer over the second servo track;

(a6) determining a second magnitude $B_P$ of the first tone using the read transducer; and (a7) computing $R_P$ by dividing $A_P$ by $B_P$.

4. The method of claim 3 in which the deriving step (c) comprises calculating $\overline{R}$ as an indication of the average adjacent-track offset for all of the servo tracks on a side of the disc.

5. The method of claim 3, wherein the deriving step (c) comprises steps of:

(c1) setting i equal 1;

(c2) setting n equal to a predetermined number of servo tracks;

(c3) positioning the write transducer over the servo track i;

(c4) writing a tone along servo track i using the write transducer;

(c5) positioning the read transducer over the servo track i;

(c6) determining a first magnitude $A_i$ of the tone written in writing step (c4) using the read transducer;

(c7) positioning the read transducer over the servo track i+1;

(c8) determining a second magnitude Bi of the tone written in writing step (c4) using the read transducer;

(c9) computing $R_i$ as the ratio of magnitude $A_i$ to magnitude $B_i$;

(c10) incrementing i by 2;

(c11) repeating steps (c3) through (c10) until i>n; and (c12) computing $\overline{R}$ as $$\overline{R} = \frac{\sum_{i=1}^{n} R_i}{n}.$$

6. The method of claim 1, wherein the deriving step (d) comprises computing the correction factor $W_P$ and $K(R_P-\overline{R})$, where K is a constant.

7. The method of claim 6, wherein the disc further includes a user track including a correction field and wherein the storing step (e) comprises storing the correction factor $W_P$ in the correction field.

8. The method of claim 6, wherein K is determined according to a method comprising steps of:
(t) positioning the read transducer over the first servo track;
(u) determining a primary magnitude $M_1$ of the first tone using the read transducer;
(v) positioning the read transducer over the second servo track;
(w) determining a secondary magnitude $M_2$ of the first tone using the read transducer;
(x) positioning the read transducer at a distance d from the second servo track and so that the read transducer is closer to the second servo track than to the first servo track;
(y) determining an additional magnitude $M_3$ of the first tone using the read transducer; and
(z) computing K as $(M_2/M_1-M_3/M_1)/d$.

9. The method of claim 1, wherein the disc drive further comprises a user track including a correction field, and wherein the storing step (e) comprises storing the correction factor $W_P$ in the correction field of the user track.

10. A data storage device comprising:
a disc having a plurality of concentric servo tracks, wherein an average distance between adjacent servo tracks on the disc is predefined, and wherein a first pair of adjacent servo tracks are separated by a distance not equal to the predefined average distance between adjacent servo tracks;
an actuator assembly including a head adjacent the disc;
a controller operably connected to the head and operable for controlling the position of the head of the actuator assembly relative to the disc, the controller further being operable to:
(a) determine a correction factor W indicative of a static track spacing error between the first pair servo tracks;
(b) store the correction factor W; and
(c) use the correction factor W during operation of the disc drive to generate a corrected position signal for use by the servo system in positioning the head with respect to the disc.

11. The data storage device of claim 10, wherein the data storage device is selected from a group consisting of magnetic disc drive, optical disc drive, and magneto-optical disc drive.

12. The data storage device of claim 10, wherein the correction factor W is stored on the disc.

13. The data storage device of claim 10, wherein the first pair of adjacent servo tracks comprises a first servo track and second servo track and wherein the correction factor W is determined by the controller performing steps of:
(i) determining R, wherein R is indicative of the distance between the first servo track and the second servo track;
(ii) determining $\overline{R}$, wherein $\overline{R}$ is indicative of an average distance between selected adjacent servo tracks on the disc; and
(iii) computing the correction factor W, where $W=K(R_i-\overline{R})$, where K is a constant.

14. The data storage device of claim 13, wherein the disc further includes a user track including a correction field and wherein the correction factor W is stored in the correction field.

15. The data storage device of claim 13, wherein the head includes a read transducer and a write transducer, wherein the disc includes a third servo track adjacent the second servo track, and wherein the determining step (a) comprises steps of:
(a)(i) positioning the write transducer over the first servo track;
(a)(ii) writing a first tone along the first servo track using the write transducer;
(a)(iii) positioning the read transducer over the first servo track;
(a)(iv) determining a first magnitude of the first tone using the read transducer;
(a)(v) denoting the first magnitude of the first tone as A;
(a)(vi) positioning the read transducer over the second servo track;
(a)(vii) determining the magnitude of the first tone using the read transducer and denoting the second magnitude of the first tone as B; and
(a)(viii) computing the ratio of magnitude A to magnitude B and denoting the ratio as R.

16. The data storage device of claim 13, wherein K is determined according to steps of:
(A) positioning the read transducer over the first servo track;
(B) determining a primary magnitude of the first tone using the read transducer and denoting the primary magnitude of the first tone as $M_1$;
(C) positioning the read transducer over the second servo track;
(D) determining a secondary magnitude of the first tone using the read transducer and denoting the secondary magnitude of the first tone as $M_2$;
(E) positioning the read transducer at a location between the second servo track and the third servo track, at distance d from the second servo track;
(F) determining an additional magnitude of the first tone using the read transducer and denoting the additional magnitude of the first tone as $M_3$; and
(G) computing K as $(M_2/M_1-M_3/M_1)/d$.

17. A data storage device comprising:
a disc having a plurality of concentric servo tracks;
means for storing correction factors to reduce a static inter-track offset irregularity between a few of the servo tracks;
the few servo tracks are a regularly-spaced series of the plurality of concentric servo tracks, in which one of the successive few tracks has a first and second adjacent track of the series, and a first and a second circumferentially-averaged offset to the first and second adjacent track respectively, and in which the correction factors reduce the inter-track offset irregularities enough so that the first and second offsets differ from each other by less than 0.1%.

* * * * *